3,251,896
PROCESS FOR THE PRODUCTION OF CYCLOHEXADIENE-1,3
François Pierre Navarre, Paris, France, assignor to Institut Francais du Petrole des Carburants et Lubrifiants, Seine-et-Oise, France
No Drawing. Filed Feb. 28, 1964, Ser. No. 348,264
Claims priority, application France, Mar. 6, 1963, 927,066; Mar. 9, 1963, 927,437
12 Claims. (Cl. 260—666)

This invention relates to a novel process for the production of cyclohexadiene-1,3, especially to a process conducted in the vapor phase in the presence of a specially prepared catalyst.

Cyclohexadiene-1,3 is a monomer which has a large potential market in the polymer field, but because the sufficiently pure form required for polymerization is relatively expensive, it has been used only in limited quantities. The high cost of the pure monomer is due to the processes that heretofore have been employed for its manufacture.

A preliminary examination of various methods to produce cyclohexadiene-1,3 reveals that a particularly simple process resides in the catalytic dehydration of cyclohexene-1-ol-3 in the vapor phase. For this process to be economically and technologically attractive, it would be necessary to achieve high rates of conversion per pass of cyclohexenol as well as high yields and purities of the cyclohexadiene product. Heretofore, however, this type of process has not attained the desired results.

Among the catalysts that have been proposed for use in the dehydration process, it is acknowledged that alumina, for example transition alumina, has been disclosed but the results obtained were not satisfactory, particularly from the purity standpoint wherein significant proportions were obtained of methyl cyclopentene and cyclohexadiene-1,4. The existence of these latter substances is exceptionally deleterious because of the effect they have when the cyclohexadiene-1,3 is eventually polymerized.

A principal object of this invention, therefore, is to provide a process to produce cyclohexadiene-1,3, which process is a substantial improvement over the previously described processes.

Another object of this invention is to provide a catalytic dehydration process for the production of cyclohexadiene-1,3, wherein the catalyst is specially prepared.

Still another object of this invention is to provide a process for the production of cyclohexadiene-1,3 wherein the proportions of methyl cyclopentene and cyclohexadiene-1,4 are reduced to a low value whereby the polymerization of cyclohexadiene-1,3 is not deleteriously affected.

A still further object is to provide a novel catalyst.

Upon further study of the specification and appended claims, still other objects and advantages of this invention become apparent.

To attain the objects of this invention, it has been discovered that cyclohexenol can be dehydrated in a particularly efficacious manner by utilizing as the catalyst an alumina produced in the following manner:

An agglomerate of transition alumina, for example the eta form, containing less than 1000 p.p.m. of alkali metal, expressed as $Na_2O$, is treated with a mixture of air and water vapor, advantageously containing 10–90% by weight of water vapor, preferably 60–85%. This treatment is conducted at a temperature on the order of 200–450° C., perferably 250–325° C. for at least 15 minutes, and preferably 1–6 hours. The rate of flow of the gaseous mixture is not critical. For example, rates of flow in the range of 1–10,000, preferably 10–1,000, liters per liter of agglomerates per hour yield substantially the same results. This treatment can be conducted at any pressure such as normal, supra atmospheric, or sub-atmospheric.

This treatment is then followed by a second treatment wherein the agglomerates are calcined in dry air at a temperature of about 300–600° C., preferably 400–525° C., for at least 15 minutes, preferably 30 minutes to 4 hours. By dry air, there is meant to be understood air containing less than 100, and preferably less than 20 p.p.m. parts by weight of water vapor.

The agglomerates of transition alumina, actually the raw catalyst which is given the special treatment of this invention, generally are produced by molding an alumina powder (alumina hydrates, or alumina already activated) into various forms such as shots, balls, granules, or pellets, and the like. The resultant shaped objects are then preferably "aged" in a humid atmosphere, for example saturated air, at about 50–100° C. for about 1 to 100 hours. The optionally "aged" alumina particles are then dried, for example at about 100–200° C., and then calcined at about 300–700° C., preferably 400–525° C. This latter calcination step "activates" the alumina and the resultant product is thus known in the art as "activated" alumina or transition alumina. The dimensions of the resultant agglomerates are generally on the order of 0.2 mm.–2 mm., preferably 1–5 mm.

It is to be further understood that any transition alumina activated in any manner known in the prior art can be employed as the raw catalyst which is given special treatment by this invention. For example, reference is respectfully directed to the Kirk-Othmer Encyclopedia of Chemical Technology, 2nd edition, vol. 2 (1963), Interscience Publishers, New York, London, Sidney, pages 48–54.

According to the dehydration process of this invention, it is advantageous to conduct the dehydration of cyclohexene-1-ol-3 at a temperature of about 180–300° C., preferably about 210–250° C. The rate of flow of the cyclohexenol is beneficially about 0.1–4, preferably 0.3–1 volumes per volume of catalyst per hour (the volume of the cyclohexanol being computed as a liquid volume). Any pressure can be utilized as long as the cyclohexenol is maintained in the vapor phase.

In some cases, the cyclohexanol is advantageously diluted by gases or vapors which are inert to the products and reactants at the operating conditions of the process. A preferred diluent is water vapor which is beneficially employed in a mol ratio of water vapor to cyclohexenol of about 1:5 to 20:1, preferably 1:1 to 10:1.

It is also to be understood that an additional advantage of this invention resides in the fact that it is unnecessary for the cyclohexenol to be pure. For example, raw cyclohexenol can be employed, containing from 0.1 up to about 5% by weight of cyclohexanol. It is an unexpected discovery of this invention that by the use of the specially treated catalyst, cyclohexenol in minor amounts remains substantially unchanged during the process.

The effluent gas recovered from the reaction zone is then fractionated. For example, the total product is condensed and then the immiscible phases are separated, for example by simple decantation. The organic phase is then distilled to obtain an overhead fraction of cyclohexadiene-1,3 and a bottoms residue. The aqueous phase, on the other hand, can be distilled in such a manner as to obtain an overhead fraction containing a small quantity of cyclohexadiene-1,3, unconverted cyclohexenol, and water vapor, and as a bottoms fraction water containing traces of cyclohexenol.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

This example describes a dehydration process based on a conventional activated alumina agglomerate.

The catalyst consists of transition alumina balls, essentially the eta form, having a diameter of about 1–3 mm. The balls were previously activated at 450° C. for 1 hour in dry air (10 parts per m. water vapor), and yielded a specific surface of 340 square meters per gram, and an alkali metal content corresponding to 700 p.p.m. of $Na_2O$.

Over 3.14 liters of this catalyst maintained at 240° C. under atmospheric pressure, cyclohexene-1-ol-3 is passed in the vapor phase and at a rate of 1.29 kg./hr. The effluent product is condensed and decanted. The organic phase is fractionated, distilled, yielding 1 kg./hr. of cyclohexadiene-1,3 having a 96% purity, and containing 3.10% by weight of cyclohexene, with 30 p.p.m. by weight of methyl cyclopentene, and 0.1% by weight of cyclohexadiene-1,4 (the impurities being determined by gas chromatography). The conversion was 98%.

*Example 2*

This example related to the employment of a catalyst prepared in accordance with this invention. The identical alumina balls of Example 1, as previously activated in Example 1, are treated in a fixed bed at a temperature of 300° C., for an hour, by a mixture of air and water vapor containing 75% by weight of water vapor. The rate of flow of the mixture over the fixed bed corresponded to 10 liters per hour per liter of balls. The resultant balls were then calcinated at 475° C. for 30 minutes in the presence of dry air containing 10 p.p.m. by weight of water vapor.

The resultant specially treated catalyst was then employed in the same dehydration step as described in Example 1. There was obtained 1.03 kg./hr. of cyclohexadiene-1,3 having a 96.5% purity, containing 3% cyclohexene, but only negligible quantities of methyl cyclopentene (lower than 10 p.p.m.) and cyclohexadiene-1,4 (lower than 30 p.p.m.).

*Example 3*

Activated alumina agglomerates are prepared by extruding a paste of 90% by weight activated alumina powder (activated at 400° C.) and 10% by weight of water, through a die having perforations of 3 mm. in diameter. The cylindrical agglomerates are then maintained for 24 hours in air at 100% relative humidity, the temperature being 70° C. The "aged" agglomerates are then dried by progressively elevating the temperature from 70 to 150° C. and the dried materials are then calcined for 2 hours at 500° C.

The resultant activated alumina agglomerates are then treated in accordance with this invention by maintaining them at 275° C. for 3 hours under an air-water vapor mixture having equal parts by weight of each component. The rate of flow of the air-water vapor mixture was 300 liters per hour per kg. of catalyst. The resultant catalyst is then calcined at 510° C. in a dry atmosphere containing 20 p.p.m. parts by weight of water vapor.

The resultant catalyst was then employed in a dehydration step wherein cyclohexene-1-ol-3 in a vapor phase is passed at a rate of 1.05 kg. per hour over 3.1 liters of the catalyst at 220° C. under atmospheric pressure. After the effluent gas is condensed, decanted and the organic phase fractionally distilled, there was obtained 0.8 kg. per hour of cyclohexadiene having a purity comparable to the product of Example 2.

*Example 4*

Example 2 is repeated, employing cyclohexene-1-ol-3 containing 2.6% by weight of cyclohexanol. The yield of cyclohexadiene-1,3 is not affected by the presence of the cyclohexanol which itself is recovered in the effluent from the reaction zone. Furthermore, the purity of the cyclohexadiene-1,3 is not significantly changed in comparison with the purity of the product obtained by Example 2.

*Example 5*

Example 2 is repeated, utilizing cyclohexene-1-ol-3 diluted with an equal volume of water vapor. There is obtained 1.01 kg./hr. of cyclohexadiene-1,3 having a purity of 97.5%.

The preceding examples are repeated with different activated alumina agglomerates, for example based on the chi, gamma and rho transition aluminas with similar results being obtained.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process of producing cyclohexadiene-1,3 which comprises passing cyclohexene-1-ol-3 in the vapor phase over a transition alumina catalyst, the improvement which comprises employing as the catalyst, a specially treated alumina prepared as follows:
    (a) treating an activated transition alumina agglomerate containing less than 1,000 p.p.m. of alkali metal, expressed as $Na_2O$, for at least 15 minutes at about 200–450° C. under an atmosphere of 10–90% by weight water vapor and 90–10% air; and
    (b) calcining the resulting agglomerate at 300–600° C. for at least 15 minutes under an atmosphere of dry air containing less than 100 p.p.m. by weight water vapor.

2. The process of claim 1, wherein the atmosphere in step (a) contains 60–85% by weight of water vapor.

3. The process of claim 1, wherein the treatment time in step (a) is about 1–6 hours.

4. The process of claim 2, wherein the treatment time in step (a) is about 1–6 hours.

5. The process of claim 1, wherein the activated transition alumina agglomerate is prepared by the steps of:
    (1) forming agglomerates from particulate material consisting essentially of a member of the group consisting of an alumina hydrate and a previously activated alumina;
    (2) aging the resultant agglomerates under a humid atmosphere at 50–100° C.;
    (3) drying the aged agglomerates at about 100–200° C.; and
    (4) calcining the dried agglomerates at 300–700° C. to form agglomerates of activated transition alumina.

6. The process of claim 4, wherein the activated transition alumina agglomerate is prepared by the steps of:
    (1) forming agglomerates from particulate material consisting essentially of a member of the group consisting of an alumina hydrate and a previously activated alumina;
    (2) aging the resultant agglomerates under a humid atmosphere at 50–100° C.;
    (3) drying the aged agglomerates at about 100–200° C.;
    (4) calcining the dried agglomerates at 300–700° C. to form agglomerates of activated transition alumina.

7. The process of claim 1, wherein the dehydration step is conducted at 180–300° C.

8. The process of claim 6, wherein the dehydration step is conducted at 180–300° C.

9. The process of claim 1, wherein the cyclohexene-1-ol-3 is diluted with water vapor.

10. The process of claim 1, wherein the cyclohexene-1-ol-3 contains 0.1–5% by weight of cyclohexanol.

11. A specially treated alumina catalyst as prepared in accordance with (a) through (c) of claim 1.

12. The process of claim 1 wherein the activated transition alumina in the agglomerate is selected from the group consisting of chi, gamma and rho aluminas.

References Cited by the Examiner

UNITED STATES PATENTS

| | | | |
|---|---|---|---|
| 2,881,051 | 4/1959 | Pingard | 23—143 |
| 3,096,376 | 7/1963 | Clement | 260—666 |
| 3,185,651 | 5/1965 | Bosc et al. | 252—463 |

OTHER REFERENCES

J. W. Newsome et al.: Technical Paper No. 10, Alumina Properties, Aluminum Company of America, Pittsburgh, Pa., p. 9, p. 46, p. 51 (1960).

DELBERT E. GANTZ, *Primary Examiner.*

V. O'KEEFE, *Assistant Examiner.*